US012413644B2

(12) United States Patent
Li et al.

(10) Patent No.: US 12,413,644 B2
(45) Date of Patent: Sep. 9, 2025

(54) METHOD, APPARATUS, AND SYSTEM FOR DYNAMIC CAPABILITY NEGOTIATION FOR IMPROVING THE EFFICIENCY OF CAPABILITY NEGOTIATION PROCESS

(71) Applicant: HUAWEI TECHNOLOGIES CO., LTD., Shenzhen (CN)

(72) Inventors: Hanlin Li, Beijing (CN); Ren Tan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 212 days.

(21) Appl. No.: 18/338,510

(22) Filed: Jun. 21, 2023

(65) Prior Publication Data

US 2023/0336631 A1 Oct. 19, 2023

Related U.S. Application Data

(63) Continuation of application No. PCT/CN2021/137442, filed on Dec. 13, 2021.

(30) Foreign Application Priority Data

Dec. 23, 2020 (CN) .......................... 202011540208.4

(51) Int. Cl.
*G06F 15/16* (2006.01)
*H04L 67/141* (2022.01)
(52) U.S. Cl.
CPC .................................. *H04L 67/141* (2013.01)
(58) Field of Classification Search
CPC . H04L 67/141; H04L 65/1069; H04L 65/752; H04L 65/80; H04L 67/145; H04L 67/146
See application file for complete search history.

(56) References Cited

U.S. PATENT DOCUMENTS 6,553,423 B1 4/2003 Chen
8,885,463 B1 * 11/2014 Medved .................. H04L 45/50
709/224

(Continued)

FOREIGN PATENT DOCUMENTS

CN 109076014 A 12/2018

OTHER PUBLICATIONS

Vasseur et al., "Path Computation Element (PCE) Communication Protocol (PCEP)", Network Working Group, IETF Trust, Mar. 2009, 87 pages.

(Continued)

*Primary Examiner* — Razu A Miah
(74) *Attorney, Agent, or Firm* — Maier & Maier, PLLC

(57) ABSTRACT

A method, an apparatus, and a system for capability negotiation, and a storage medium, and relates to the communication field. The method includes: a first network entity obtains a capability update message, where the capability update message includes capability update information, and the capability update information indicates at least one capability to be updated of the first network entity. The first network entity sends the capability update message to the second network entity based on a capability negotiation session established between the first network entity and a second network entity. The embodiments can simplify a process of capability negotiation, thereby improving efficiency of capability negotiation, achieving dynamic negotiation of a capability, and reducing load of a PCC and a PCE.

17 Claims, 5 Drawing Sheets

(56) References Cited

U.S. PATENT DOCUMENTS

| | | | |
|---|---|---|---|
| 2010/0220996 A1* | 9/2010 | Lee | H04L 45/62 398/25 |
| 2016/0094596 A1* | 3/2016 | Goepp | H04L 12/1827 709/204 |
| 2016/0182381 A1* | 6/2016 | Li | H04L 45/64 370/235 |
| 2016/0234188 A1* | 8/2016 | Guan | H04L 63/166 |
| 2016/0241683 A1 | 8/2016 | Ye et al. | |
| 2017/0244628 A1* | 8/2017 | Chen | H04L 45/122 |
| 2019/0053148 A1* | 2/2019 | Lee | H04W 48/18 |
| 2019/0349792 A1* | 11/2019 | Xu | H04L 41/342 |
| 2020/0252234 A1* | 8/2020 | Ramamoorthi | H04L 41/0895 |
| 2021/0036931 A1* | 2/2021 | Lee | H04L 45/50 |

OTHER PUBLICATIONS

Sivabalan et al., "Conveying Path Setup Type in PCE Communication Protocol (PCEP) Messages", Internet Engineering Task Force (IETF), IETF Trust, Jul. 2018, ISSN: 2070-1721, 12 pages.

Minei et al., "RFC 8697 Path Computation Element Communication Protocol (PCEP) Extensions for Establishing Relationships between Sets of Label Switched Paths (LSPs)", Internet Engineering Task Force (IETF), IETF Trust, Jan. 2020, ISSN: 2070-1721, 28 pages.

* cited by examiner

METHOD, APPARATUS, AND SYSTEM FOR DYNAMIC CAPABILITY NEGOTIATION FOR IMPROVING THE EFFICIENCY OF CAPABILITY NEGOTIATION PROCESS

CROSS-REFERENCE TO RELATED APPLICATIONS

This application is a continuation of International Application No. PCT/CN2021/137442, filed on Dec. 13, 2021, which claims priority to Chinese Patent Application No. 202011540208.4, filed on Dec. 23, 2020. The disclosures of the aforementioned applications are hereby incorporated by reference in their entireties.

TECHNICAL FIELD

The embodiments relate to the communication field and to a method, an apparatus, and a system for capability negotiation, and a storage medium.

BACKGROUND

A path computation element (PCE) is an entity that computes a network path or a constraint route based on network topology information. A path computation client (PCC) is an entity that sends a path request to a PCE, and is usually a service entry node that requests the PCE to compute a path. When requesting path computation, a PCC needs to negotiate with a PCE about a required capability.

Currently, after capability negotiation, the PCC or the PCE may need to add or reduce a negotiated capability, to be specific, a capability required by the PCC or the PCE changes, and the PCC and the PCE need to renegotiate a changed capability. However, currently, when the PCC and the PCE negotiate the changed capability, a complex process is required to negotiate the changed capability, not only resulting in low efficiency of capability negotiation, but also increasing load of the PCC and the PCE.

SUMMARY

The embodiments include a method, an apparatus, and a system for capability negotiation, and a storage medium, to simplify a process of capability negotiation, thereby improving efficiency of capability negotiation, and reducing load of a PCC and a PCE. Solutions are as follows.

According to a first aspect, an embodiment provides a method for capability negotiation. In the method, a first network entity obtains a capability update message. The capability update message includes capability update information. The capability update information indicates at least one capability to be updated of the first network entity. The first network entity sends the capability update message to the second network entity based on a capability negotiation session established between the first network entity and a second network entity.

The first network entity sends the capability update message to the second network entity based on a capability negotiation session established between the first network entity and a second network entity. For example, when the first network entity renegotiates a capability, the first network entity does not need to disconnect from the capability negotiation session or re-establish a capability session with the second network entity, but directly uses the capability negotiation session established between the first network entity and the second network entity to renegotiate the capability, to implement dynamic capability negotiation. In this way, a process of capability renegotiation is simplified, thereby not only improving efficiency of capability negotiation, but also reducing load of the first network entity and the second network entity. The first network entity is a PCC, and the second network entity is a PCE: or the first network entity is a PCE, and the second network entity is a PCC, and the load of the PCC and the PCE is reduced.

In a possible implementation, the at least one capability includes an updated capability of the first network entity, and the capability update information includes capability information of the updated capability. Because the capability update information includes the capability information of the updated capability, the second network entity may negotiate the updated capability of the first network entity.

In another possible implementation, the at least one capability includes an added capability of the first network entity, and the capability update information includes capability information of the added capability. Because the capability update information includes the capability information of the added capability, the second network entity may obtain, based on the capability update information, the updated capability of the first network entity, and negotiate the updated capability of the first network entity.

In another possible implementation, the at least one capability includes a reduced capability of the first network entity, and the capability update information includes capability information of the reduced capability. Because the capability update information includes the capability information of the reduced capability, the second network entity may obtain, based on the capability update information, the updated capability of the first network entity, and negotiate the updated capability of the first network entity.

In another possible implementation, the first network entity establishes the capability negotiation session. The first network entity negotiates one or more capabilities with the second network entity based on the capability negotiation session. Before a capability of the first network entity is updated, the first network entity has established the capability negotiation session. After the capability of the first network entity is updated, the first network entity may directly use the capability negotiation session to renegotiate the capability. In this way, a process of capability renegotiation is simplified, thereby not only improving efficiency of capability negotiation, but also reducing load of the first network entity and the second network entity.

In another possible implementation, the capability update message includes a path computation element communication protocol open (PCEP open) message or a path computation element communication protocol notification (PCNtf) message.

In another possible implementation, if the capability update message includes the PCEP open message, the PCEP open message further includes a dynamic capability negotiation identifier. The dynamic capability negotiation identifier indicates to renegotiate a capability required by the first network entity. Because the dynamic capability negotiation identifier indicates to renegotiate a capability required by the first network entity, the second network entity may determine, based on the dynamic capability negotiation identifier, that the first network entity needs to renegotiate a capability.

In another possible implementation, when the capability update message includes the PCNtf message, a payload of the PCNtf message includes the capability update information. Because the payload of the PCNtf message includes the capability update information, the second network entity may determine that the payload of the PCNtf message includes the capability update information, and further determine that the first network entity needs to renegotiate a capability.

In another possible implementation, the capability negotiation session is a PCEP session.

According to a second aspect, an embodiment provides a method for capability negotiation. In the method, a second network entity receives, based on a capability negotiation session established between the second network entity and a first network entity, a capability update message sent by the first network entity. The capability update message includes capability update information. The capability update information indicates at least one capability to be updated of the first network entity. The second network entity updates an effective capability of the second network entity based on the at least one capability.

The first network entity receives, based on a capability negotiation session established between the second network entity and a first network entity, a capability update message sent by the first network entity, for example, when a capability is renegotiated with the first network entity, the capability negotiation session does not need to be disconnected, and a capability session with the first network entity does not need to be re-established, but the capability negotiation session established between the first network entity and the second network entity is directly used to renegotiate the capability, to implement dynamic capability negotiation. In this way, a process of capability renegotiation is simplified, thereby not only improving efficiency of capability negotiation, but also reducing load of the first network entity and the second network entity. The first network entity is a PCC, and the second network entity is a PCE: or the first network entity is a PCE, and the second network entity is a PCC, and load of the PCC and the PCE is reduced.

In a possible implementation, the at least one capability includes an updated capability of the first network entity, and the capability update information includes capability information of the updated capability. Because the capability update information includes the capability information of the updated capability, the second network entity may implement negotiation on the updated capability of the first network entity.

In another possible implementation, the at least one capability includes an added capability of the first network entity, and the capability update information includes capability information of the added capability. Because the capability update information includes the capability information of the added capability, the second network entity obtains, based on the capability update information, the updated capability of the first network entity, to implement negotiation on the updated capability of the first network entity.

In another possible implementation, the at least one capability includes a reduced capability of the first network entity, and the capability update information includes capability information of the reduced capability. Because the capability update information includes the capability information of the reduced capability, the second network entity may obtain, based on the capability update information, the updated capability of the first network entity, to implement negotiation on the updated capability of the first network entity.

In another possible implementation, the second network entity establishes the capability negotiation session. The second network entity negotiates one or more capabilities with the first network entity based on the capability negotiation session. The effective capability includes a capability that is successfully negotiated by the second network entity. Before a capability of the first network entity is updated, the second network entity has established the capability negotiation session. After the capability of the first network entity is updated, the second network entity may directly use the capability negotiation session to renegotiate the capability. In this way, a process of capability renegotiation is simplified, thereby not only improving efficiency of capability negotiation, but also reducing load of the first network entity and the second network entity.

In another possible implementation, the capability update message includes a path computation element communication protocol open (PCEP open) message or a path computation element communication protocol notification (PCNtf) message.

In another possible implementation, if the capability update message includes the PCEP open message, the PCEP open message further includes a dynamic capability negotiation identifier. The dynamic capability negotiation identifier indicates to renegotiate a capability required by the first network entity. Because the dynamic capability negotiation identifier indicates to renegotiate a capability required by the first network entity, the second network entity may determine, based on the dynamic capability negotiation identifier, that the first network entity needs to renegotiate a capability.

In another possible implementation, when triggered by the dynamic capability negotiation identifier, the second network entity updates the effective capability of the second network entity based on the at least one capability. In this way, the second network entity may determine, based on the dynamic capability negotiation identifier, that it is necessary to renegotiate a capability with the first network entity.

In another possible implementation, if the capability update message includes the PCNtf message, a payload of the PCNtf message includes the capability update information. Because the payload of the PCNtf message includes the capability update information, the second network entity determines that the payload of the PCNtf message includes the capability update information, and further determines that the first network entity needs to renegotiate a capability.

In another possible implementation, the capability negotiation session is a PCEP session.

According to a third aspect, an embodiment provides an apparatus for capability negotiation, configured to perform the method performed by the first network entity in any one of the first aspect or the possible implementations of the first aspect. For example, the apparatus includes a unit configured to perform the method performed by the first network entity in any one of the first aspect or the possible implementations of the first aspect.

According to a fourth aspect, an embodiment provides an apparatus for capability negotiation, configured to perform the method performed by the second network entity in any one of the second aspect or the possible implementations of the second aspect. For example, the apparatus includes a unit configured to perform the method performed by the second network entity in any one of the second aspect or the possible implementations of the second aspect.

According to a fifth aspect, an embodiment provides an apparatus for capability negotiation. The apparatus includes a transceiver, a processor, and a memory. The transceiver, the processor, and the memory may be connected through an internal connection. The memory is configured to store a program, and the processor is configured to execute the program in the memory and match the transceiver, to enable the apparatus to complete the method performed by the first network entity in any one of the first aspect or the possible implementations of the first aspect.

According to a sixth aspect, an embodiment provides an apparatus for capability negotiation. The apparatus includes a transceiver, a processor, and a memory. The transceiver, the processor, and the memory may be connected through an internal connection. The memory is configured to store a program, and the processor is configured to execute the program in the memory and match the transceiver, to enable the apparatus to complete the method performed by the second network entity in any one of the second aspect or the possible implementations of the second aspect.

According to a seventh aspect, an embodiment provides a computer program product. The computer program product includes a computer program stored in a computer-readable storage medium. The computer program is loaded by a processor to implement the method according to any one of the first aspect, the second aspect, the possible implementations of the first aspect, or the possible implementations of the second aspect.

According to an eighth aspect, an embodiment provides a computer-readable storage medium, configured to store a computer program. The computer program is loaded by a processor to perform the method in any one of the first aspect, the second aspect, the possible implementations of the first aspect, or the possible implementations of the second aspect.

According to a ninth aspect, an embodiment provides a system for capability negotiation. The system includes the apparatus according to the third aspect and the apparatus according to the fourth aspect, or the system includes the apparatus according to the fifth aspect and the apparatus according to the sixth aspect.

DETAILED DESCRIPTION OF THE EMBODIMENTS

The following further describes in detail embodiments with reference to accompanying drawings.

Figure 1:
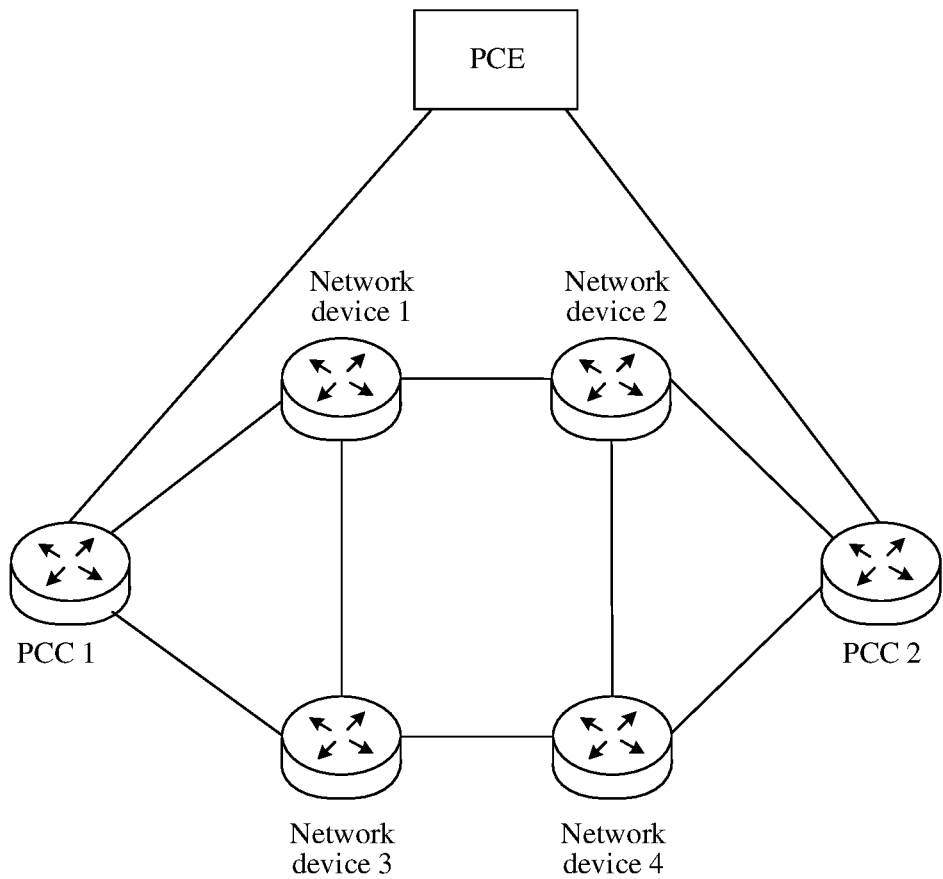
FIG. 1 is a schematic diagram of a network architecture according to an embodiment.

Referring to FIG. 1, an embodiment provides a network architecture. The network architecture includes a PCE and at least one PCC (for example, in the network architecture shown in FIG. 1, the at least one PCC includes a PCC 1 and a PCC 2). For each PCC, the PCC may communicate with the PCE.

The PCC may perform service interaction with the PCE. In an example in which the service is a path service, the PCC may request the PCE to establish a path. Alternatively, the PCE may actively establish a path for the PCC and send path information of the path to the PCC.

The established path is a path between the PCC and a device. For example, FIG. 1 is used as an example. It is assumed that a PCC 1 requests a PCE to establish a path, the path is a path between the PCC 1 and the PCC 2, and devices on the path include the PCC 1, a network device 1, a network device 2, and the PCC 2.

In addition to the foregoing path service, other services interacted between the PCC and the PCE may further exist. The other services are not listed one by one.

The PCC may be a network device, a client or an application program run on the network device, or the like. The PCE is a network device, a server, a controller, a network management device, a client or an application program run on the network device, the server, the network management device, or the controller, or the like. The network device includes a device such as a switch, a router, a gateway, or a base station.

The PCC supports at least one capability, and the PCE also supports at least one capability. The at least one capability may include a segment routing internet protocol version 6 (SRv6) capability, a segment routing traffic engineering (SR-TE) capability, a PCE-initiated label switched path (PCE-initiated-LSP) capability, and/or a segment routing policy (SR policy) capability, and the like.

Before performing service interaction with the PCE, the PCC may first negotiate a capability with the PCE. A process of capability negotiation between the PCC and the PCE includes the following operations (11) to (13).

(11): The PCC establishes a network connection with the PCE.

The network connection between the PCC and the PCE may be a transmission control protocol (transmission control protocol, TCP) connection. For example, the PCC may establish a TCP connection with the PCE through a TCP three-way handshake mechanism.

(12): The PCC establishes a capability negotiation session with the PCE.

The capability negotiation session may be a path computation element communication protocol (path computation element communication protocol, PCEP) session.

(13): The PCC negotiates one or more capabilities with the PCE based on the capability negotiation session.

Figure 2:
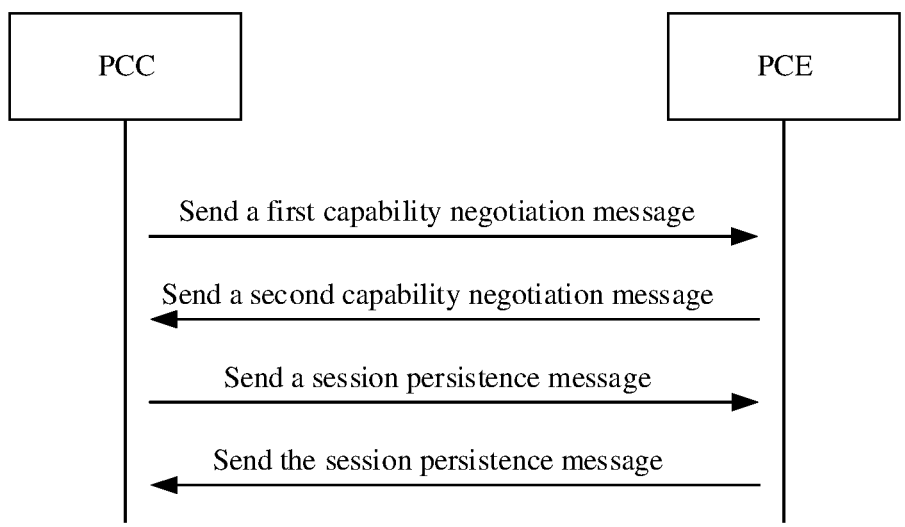
FIG. 2 is a flowchart of a method for capability negotiation and maintaining a capability negotiation session according to an embodiment.

Referring to FIG. 2, in step (13), the PCC sends a first capability negotiation message to the PCE based on the capability negotiation session. The first capability negotiation message includes capability information of at least one capability to be negotiated. The at least one capability is a capability supported by the PCC. The PCE receives the first capability negotiation message, obtains the at least one capability based on the capability information included in the first capability negotiation message, and determines a capability supported by the PCE from the at least one capability. The determined capability is a capability supported by both the PCC and the PCE. The PCE configures a capability of the capability negotiation session on a PCE side as the determined capability.

The PCE also sends a second capability negotiation message to the PCC based on the capability negotiation session. The second capability negotiation message includes capability information of at least one capability to be negotiated. The at least one capability is a capability supported by the PCE. The PCC receives the second capability negotiation message, obtains the at least one capability based on the capability information included in the second capability negotiation message and determines a capability supported by the PCC from the at least one capability. The determined capability is a capability supported by both the PCC and the PCE. The PCC configures a capability of the capability negotiation session on the PCC side as the determined capability.

For example, it is assumed that a capability supported by a PCC includes an SRv6 capability and an SR-TE capability, and a capability supported by a PCE includes an SRv6 capability, an SR-TE capability, and an SR policy capability. The PCC sends a first capability negotiation message to the PCE based on the capability negotiation session. The first capability negotiation message includes capability information of the SRv6 capability and capability information of the SR-TE capability. The PCE receives the first capability negotiation message, determines, based on the capability information included in the first capability negotiation message, that both the PCC and the PCE support the SRv6 capability and the SR-TE capability, and configures a capability of the capability negotiation session on the PCE side as the SRv6 capability and the SR-TE capability.

The PCE also sends a second capability negotiation message to the PCC based on the capability negotiation session. The second capability negotiation message includes capability information of the SRv6 capability, capability information of the SR-TE capability, and capability information of the SR policy capability. The PCC receives the second capability negotiation message, determines, based on the capability information included in the second capability negotiation message, that both the PCC and the PCE support the SRv6 capability and the SR-TE capability, and configures the capability of the capability negotiation session on the PCC side as the SRv6 capability and the SR-TE capability.

Because the first capability negotiation message sent by the PCC to the PCE includes capability information of a capability supported by the PCC, the PCE may record the capability supported by the PCC. In addition, because the second capability negotiation message sent by the PCE to the PCC includes capability information of a capability supported by the PCE, the PCC also records the capability supported by the PCE.

After the capability is negotiated, the PCC can perform service interaction with the PCE based on the capability negotiation session. For example, a path service is still used as an example. The PCC may request, based on the capability negotiation session, the PCE to establish a path. The path corresponds to a capability. If the capability corresponding to the path is the capability of the capability negotiation session on the PCE side, the PCE establishes the path for the PCC: or if the capability corresponding to the path is not the capability of the capability negotiation session on the PCE side, the PCE rejects to establish the path for the PCC.

Alternatively, the PCE establishes a path for the PCC, and sends path information of the path to the PCC based on the capability negotiation session. If the capability corresponding to the path is the capability of the capability negotiation session on the PCC side, the PCC receives the path information of the path: or if the capability corresponding to the path is not the capability of the capability negotiation session on the PCC side, the PCC rejects to receive the path information of the path.

Referring to FIG. 2, after the capability is negotiated, the PCC and the PCE need to maintain the capability negotiation session not to be disconnected. The PCC periodically or irregularly sends a session persistence message to the PCE, and the PCE periodically or irregularly sends a session persistence message to the PCC. In this way, the PCC and the PCE maintain the capability negotiation session not to be disconnected by sending the session persistence message to each other, to enable the capability negotiation session to always exist between the PCC and the PCE.

The session persistence message may be a heartbeat message. For example, the session persistence message may be a path computation element communication protocol keepalive (PECP Keepalive) message or another message. The first capability negotiation message or the second capability negotiation message may be an open message or another message that is defined by the PCEP.

In some embodiments, capability information of a capability includes an identifier of the capability, and the like.

It should be noted that after the PCC and the PCE negotiate a capability, the capability supported by the PCC or the capability supported by the PCE may be updated. The PCC may add a new capability or reduce a supported capability. In this case, the PCC needs to negotiate with the PCE about a capability to be updated of the PCC. Alternatively, the PCE adds a new capability or reduces a supported capability. In this case, the PCE needs to negotiate with the PCC about a capability to be updated of the PCE. The PCC or the PCE may negotiate a capability to be updated according to any one of the following embodiments.

Figure 3:
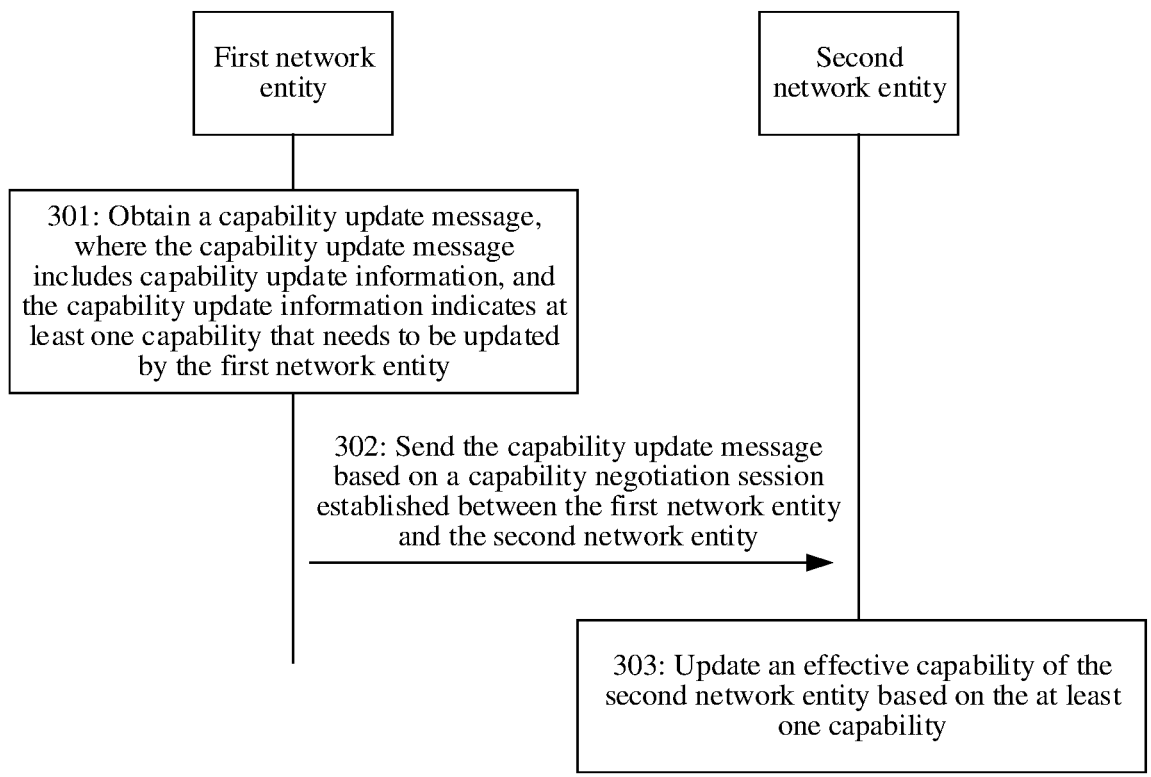
FIG. 3 is a flowchart of a method for capability negotiation according to an embodiment.

Referring to FIG. 3, an embodiment provides a method for capability negotiation. The method may be applied to the network architecture shown in FIG. 1. When a capability of a PCC is updated or a capability of a PCE is updated, the PCC or the PCE negotiates, through the method, a capability to be updated. The method includes the following steps.

Operation 301: A first network entity obtains a capability update message. The capability update message includes capability update information. The capability update information indicates at least one capability to be updated of the first network entity.

The first network entity is the PCC or the PCE. A capability supported by the first network entity may be updated. For example, the first network entity may add a capability to be supported or reduce a supported capability.

The at least one capability to be updated of the first network entity includes the added capability or the reduced capability. Alternatively, the at least one capability to be updated of the first network entity includes an updated capability of the first network entity. The updated capability of the first network entity includes a supported capability of the first network entity after the capability of the first network entity is added, or a remaining supported capability of the first network entity after the capability of the first network entity is reduced.

The following uses an example for description. The capability supported by the first network entity includes an SRv6 capability and an SR-TE capability. It is assumed that the capability supported by the first network entity is updated. The update includes adding a capability to be supported or reducing a supported capability. The following two examples are listed to describe the two update cases.

In a first example, the first network entity adds a capability to be supported. It is assumed that the added capability of the first network entity is an SR policy capability, the updated capability of the first network entity includes an SRv6 capability, an SR-TE capability, and an SR policy capability. Therefore, the at least one capability to be updated of the first network entity includes the added SR policy capability. Alternatively, the at least one capability to be updated of the first network entity includes an updated capability of the first network entity, to be specific, includes an SRv6 capability, an SR-TE capability, and an SR policy capability.

In a second example, the first network entity reduces a supported capability. It is assumed that the reduced capability of the first network entity is an SRv6 capability, the updated capability of the first network entity includes an SR-TE capability. Therefore, the at least one capability to be updated of the first network entity includes the reduced SRv6 capability. Alternatively, the at least one capability to be updated of the first network entity includes an updated capability of the first network entity, for example, includes an SR-TE capability.

For the foregoing capability update message, a payload of the capability update message includes capability update information.

The payload of the capability update message may include a type length value (TLV) field. The TLV field includes the capability update information.

The TLV field includes a Type field, a Length field, and a Value field. The Value field includes the capability update information.

The capability update information may indicate, in the following two manners, the at least one capability to be updated of the first network entity.

In a first manner, the capability update information includes capability information of each of the at least one capability.

For each of the at least one capability to be updated of the first network entity, the capability information of the capability may include content such as a capability identifier of the capability.

If the at least one capability includes the added capability, the capability update information includes capability information of the added capability. For example, for the first example listed above, the first network entity adds an SR policy capability, and the capability update information includes capability information of the added SR policy capability.

If the at least one capability includes the reduced capability, the capability update information includes capability information of the reduced capability. For example, for the second example listed above, the first network entity reduces an SRv6 capability, and the capability update information includes capability information of the reduced SRv6 capability.

If the at least one capability includes the updated capability, the capability update information includes capability information of the updated capability. For example, for the first example listed above, the updated capability of the first network entity includes an SRv6 capability, an SR-TE capability, and an SR policy capability. The capability update information includes capability information of the SRv6 capability, capability information of the SR-TE capability, and capability information of the SR policy capability. For another example, for the second example listed above, the updated capability of the first network entity includes an SR-TE capability, and the capability update information includes capability information of the SR-TE capability.

In a second manner, the capability update information is a field in a payload of the capability update message. Different bits in the field correspond to different capabilities. A value of a bit corresponding to each of the at least one capability in the field is a first specified value, and a value of another bit in the field is a second specified value.

Figure 4:
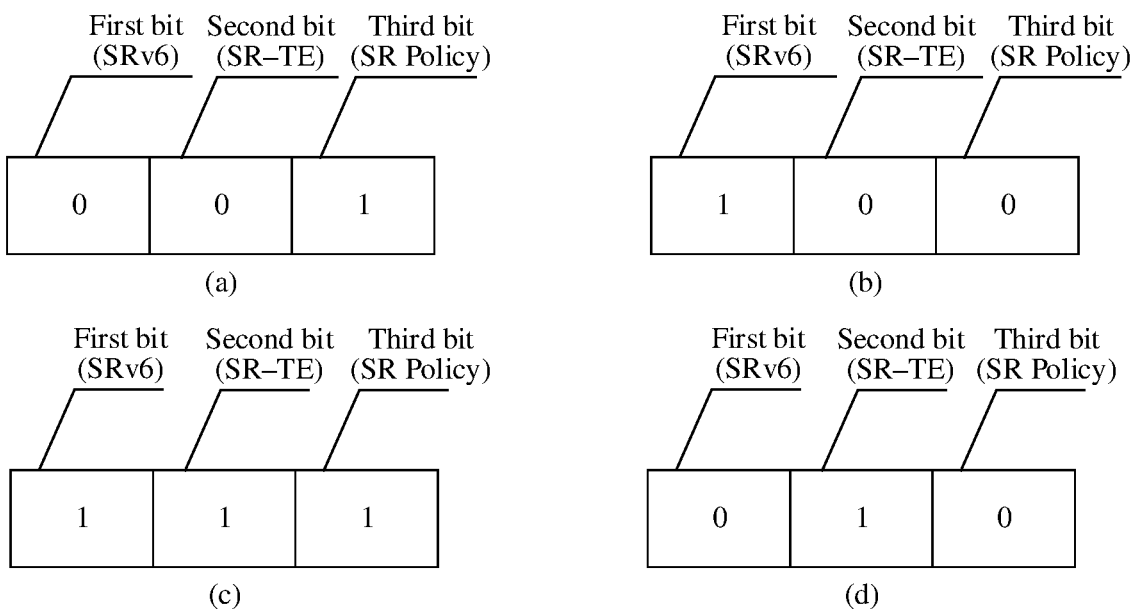
FIG. 4 is a schematic diagram of capability update information according to an embodiment.

For example, the field shown in FIG. 4 is a field in the payload of the capability update message. The field includes three bits, and the three bits include a first bit, a second bit, and a third bit. The first bit, the second bit, and the third bit respectively correspond to an SRv6 capability, an SR-TE capability, and an SR policy capability. It is assumed that the first specified value is 1, and the second specified value is 0. The capability update information is the field. In the field, a value of a bit corresponding to each of the at least one capability is the first specified value 1, and a value of another bit is the second specified value 0.

If the at least one capability includes the added capability, in the capability update information, a value of a bit corresponding to the added capability is a first specified value, and a value of another bit is a second specified value. For example, for the first example listed above, the first network entity adds an SR policy capability. In the capability update information, a value of a third bit corresponding to the added SR policy capability is a first specified value 1, and values of the first bit and the second bit are both a second specified value 0. The capability update information is shown in (a) in FIG. 4.

If the at least one capability includes the reduced capability, in the capability update information, a value of a bit corresponding to the reduced capability is a first specified value, and a value of another bit is a second specified value. For example, for the second example listed above, the first network entity reduces an SRv6 capability. In the capability update information, a value of a first bit corresponding to the reduced SRv6 capability is 1, and a value of a second bit and a value of a third bit are both a second specified value 0. The capability update information is shown in (b) in FIG. 4.

If the at least one capability includes the updated capability, in the capability update information, a value of a bit corresponding to each updated capability is a first specified value, and a value of another bit is a second specified value. For example, for the first example listed above, the updated capability of the first network entity includes an SRv6 capability, an SR-TE capability, and an SR policy capability. In the capability update information, a value of a first bit corresponding to the SRv6 capability, a value of a second bit corresponding to the SR-TE capability, and a value of a third bit corresponding to the SR policy capability are all a first specified value 1, as shown in (c) in FIG. 4. For another example, for the second example listed above, the updated capability of the first network entity includes an SR-TE capability. In the capability update information, a value of a second bit corresponding to the SR-TE capability is a first specified value 1, and a value of a first bit and a value of a third bit are both a second specified value 0, as shown in (d) in FIG. 4.

If the at least one capability includes an added capability or a reduced capability, the capability update message may further include indication information. The indication information indicates a capability update status of the first network entity, for example, the indication information indicates whether the capability update status of the first network entity is to add a capability or reduce a capability.

The capability update message includes a PCEP open message, a path computation element communication protocol notification (PCNtf) message, or the like.

In addition to the PCEP open message or the PCNtf message listed above, the capability update message may be another message. This is not listed one by one herein.

If the capability update message includes the PCEP open message, the PCEP open message further includes a dynamic capability negotiation identifier. The dynamic capability negotiation identifier indicates to renegotiate a capability required by the first network entity.

Figure 5:
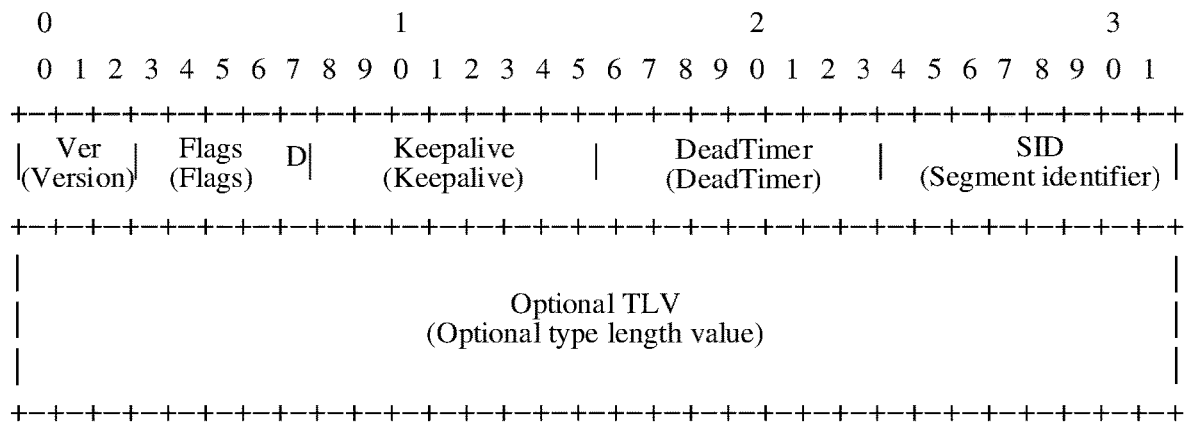
FIG. 5 is a schematic diagram of a structure of a PCEP open message according to an embodiment.

Referring to FIG. 5, the PCEP open message includes a version (Ver), flags, a keepalive, a deadtimer, a segment identifier (SID), and an optional TLV.

A sub-field in the Flags may be used to include the dynamic capability negotiation identifier, and a length of the sub-field is one or more bits. For example, refer to FIG. 5. A sub-field D is defined in the Flags, and the sub-field D is used to include the dynamic capability negotiation identifier. In addition, the optional TLV may be used to include the capability update information.

If the at least one capability includes an added capability or a reduced capability, the optional TLV may be further used to include the indication information.

The PCEP open message is different from a PCEP-defined Open message. A difference lies in that the PCEP open message includes a dynamic capability negotiation identifier, indicating that the PCEP open message is a capability update message used for capability renegotiation.

If the capability update message includes the PCNtf message, a payload of the PCNtf message includes the capability update information.

Figure 6:
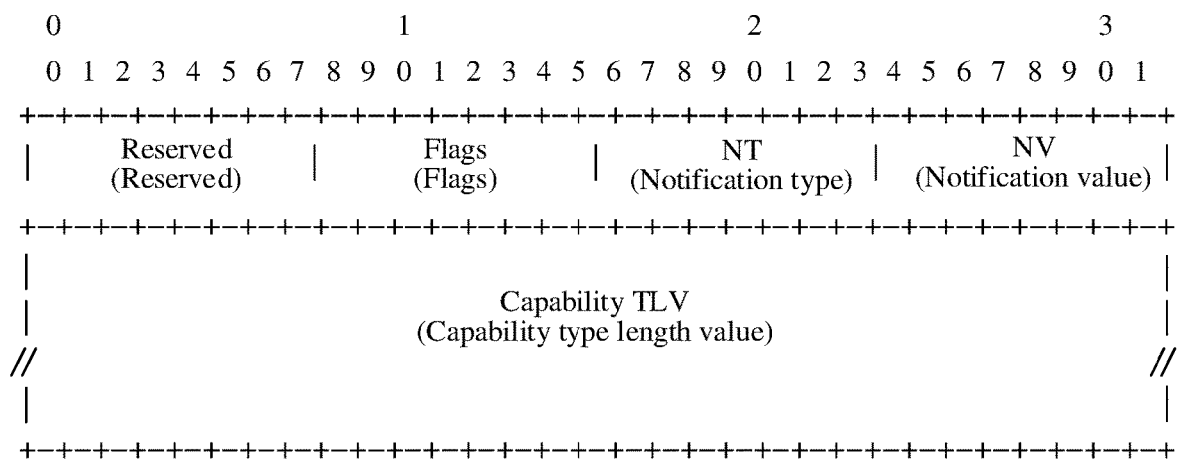
FIG. 6 is a schematic diagram of a structure of a PCNtf message according to an embodiment.

Referring to FIG. 6, the PCNtf message includes a reserved, flags, a notification type (NT), a notification value (NV), and a capability TLV.

The capability TLV may be used to include the capability update information.

If the at least one capability includes an added capability or a reduced capability, the capability TLV may further be used to include the indication information.

The PCNtf message is different from a PCEP-defined notification message. A difference lies in that a capability TLV is added to a payload of the PCNtf message, and the capability TLV includes the capability update information, indicating that the PCEP open message is a capability update message used for capability renegotiation.

Operation 302: The first network entity sends the capability update message to the second network entity based on a capability negotiation session established between the first network entity and a second network entity.

If the first network entity is the PCC, the second network entity is the PCE. Alternatively, if the first network entity is the PCE, the second network entity is the PCC.

The capability negotiation session may be a session used by the first network entity and the second network entity for capability negotiation last time. The capability negotiation session may be a session established when the first network entity and the second network entity perform capability negotiation for the first time.

Referring to FIG. 2, a first network entity and a second network entity establish a capability negotiation session when negotiating a capability for the first time. Then, the first network entity and the second network entity periodically or irregularly send a session persistence message to each other, and maintain the capability negotiation session not to be disconnected through the session persistence message sent to each other.

Therefore, when the capability of the first network entity is updated, the first network entity may directly send the capability update message to the second network entity based on the capability negotiation session. In this way, a process of capability renegotiation is simplified, thereby improving efficiency of capability renegotiation, and reducing load of the first network entity and the second network entity.

Because the first network entity has recorded capabilities supported by the second network entity, after the capability of the first network entity is updated, the first network entity determines, from the recorded capabilities supported by the second network entity, a capability supported by both the first network entity and the second network entity. A capability of the capability negotiation session on the first network entity side is updated by the first network entity to a determined capability.

The operation of determining, by the first network entity, a capability supported by both the first network entity and the second network entity may include: obtaining, by the first network entity, an intersection set between the recorded capability supported by the second network entity and an updated capability of the first network entity. A capability included in the intersection set is a capability supported by both the first network entity and the second network entity.

For example, it is assumed that the capability supported by the second network entity includes an SRv6 capability, an SR-TE capability, and an SR policy capability. For the first example listed above, the updated capability of the first network entity includes an SRv6 capability, an SR-TE capability, and an SR policy capability. The first network entity determines that the capability supported by both the first network entity and the second network entity includes an SRv6 capability, an SR-TE capability, and an SR policy capability. The capability of the capability negotiation session on the first network entity side is updated to an SRv6 capability, an SR-TE capability, and an SR policy capability.

In the second example listed above, the updated capability of the first network entity includes an SR-TE capability. The first network entity determines that a capability supported by both the first network entity and the second network entity includes an SR-TE capability. The capability of the capability negotiation session on the first network entity side is updated to an SR-TE capability.

Operation 303: The second network entity receives the capability update message. Capability update information included in the capability update message indicates at least one capability, and updates an effective capability of the second network entity based on the at least one capability.

If the capability update message is a PCEP open message, when triggered by the dynamic capability negotiation identifier included in the PCEP open message, the second network entity updates the effective capability of the second network entity based on the at least one capability.

If the capability update message is a PCNtf message, when detecting that the payload of the PCNtf message includes the capability update information, the second network entity determines that the capability supported by the first network entity is updated, and updates the effective capability of the second network entity based on the at least one capability.

The second network entity may update the effective capability by performing the following operations 3031 to 3033. The effective capability includes a capability of the capability negotiation session on the second network entity side. The operations 3031 to 3033 include the following content:

3031. The second network device obtains, based on the capability update information in the capability update message, each updated capability of the first network entity.

At least one capability indicated by the capability update information may be an added capability or a reduced capability of the first network entity. Alternatively, at least one capability indicated by the capability update information may be an updated capability of the first network entity.

If the at least one capability indicated by the capability update information is an added capability or a reduced capability of the first network entity, when the second network entity negotiates a capability with the first network entity last time, the second network entity records the capability supported by the first network entity. The second network entity may obtain each updated capability by the first network entity through the following operations (1) to (3).

(1): The second network entity determines the at least one capability indicated by the capability update information.

The second network entity may determine the at least one capability by using the following manner 1 and manner 2. The manner 1 and the manner 2 are respectively as follows.

Manner 1: The capability update information includes capability information of an added capability or capability information of a reduced capability of the first network entity. The second network entity determines that the at least one capability includes a capability corresponding to each of the capability update information.

For example, in the foregoing first example, the capability update information includes the capability information of the added SR policy capability. In this case, the second network entity determines that the at least one capability includes the SR policy capability. For another example, in the foregoing second example, the capability update information includes capability information of the reduced SRv6 capability. In this case, the second network entity determines that the at least one capability includes the SRv6 capability.

Manner 2: The capability update information is a field in the capability update message. The second network entity obtains a bit that is in the field and whose value is a first specified value. The second network entity determines that the at least one capability includes a capability corresponding to the obtained bit.

For example, in the foregoing first example, the capability update information is a field shown in (a) in FIG. 4. In this case, the second network entity obtains a third bit that is in the field and whose value is the first specified value 1, and determines that the at least one capability includes the SR policy capability corresponding to the third bit. For another example, in the foregoing second example, the capability update information is a field shown in (b) in FIG. 4. In this case, the second network entity obtains a first bit that is in the field and whose value is the first specified value 1, and determines that the at least one capability includes the SRv6 capability corresponding to the first bit.

(2): When the second network entity determines that the first network entity adds a capability, the obtained updated capability of the first network entity includes the capability recorded by the second network entity and the at least one capability.

If the capability recorded by the second network entity does not include the at least one capability, it indicates that the at least one capability is an added capability of the first network entity, to determine that the first network entity adds a capability.

When the capability update message includes indication information, and the indication information indicates the first network entity to add a capability, it is determined that the first network entity adds a capability.

(3): When the second network entity determines that the first network entity reduces a capability, the second network entity removes the at least one capability from capabilities recorded by the second network entity. A remaining capability is an updated capability of the first network entity.

If the capability recorded by the second network entity includes the at least one capability, it indicates that the at least one capability is a reduced capability of the first network entity, to determine that the first network entity reduces a capability.

When the capability update message includes indication information, and the indication information indicates the first network entity to reduce a capability, it is determined that the first network entity reduces a capability.

If the at least one capability indicated by the capability update information is the updated capability of the first network entity, the second network entity may obtain the updated capability of the first network entity based on the following manner 1 and manner 2.

Manner 1: The capability update information includes capability information of the updated capability of the first network entity. In this case, the updated capability of the first network entity is obtained based on the capability update information, and the obtained capability includes a capability corresponding to capability information in the capability update information.

For example, in the foregoing first example, the capability update information includes capability information of an updated SRv6 capability, capability information of an SR-TE capability, and capability information of an SR policy capability of the first network entity. In this case, the updated capability of the first network entity obtained by the second network entity includes an SRv6 capability, an SR-TE capability, and an SR policy capability. For another example, in the foregoing second example, the capability update information includes capability information of the updated SR-TE capability of the first network entity. In this case, the updated capability of the first network entity obtained by the second network entity includes an SR-TE capability.

Manner 2: The capability update information is a field in the capability update message. In this case, the second network entity obtains a bit that is in the field and whose value is the first specified value, and the obtained updated capability of the first network entity includes a capability corresponding to the obtained bit.

For example, in the foregoing first example, the capability update information is a field shown in (c) in FIG. 4. In this case, the second network entity obtains a first bit, a second bit, and a third bit that are in the field and whose values are the first specified value 1, and the obtained updated capability of the first network entity includes an SRv6 capability corresponding to the first bit, an SR-TE capability corresponding to the second bit, and an SR policy capability corresponding to the third bit. For another example, in the foregoing second example, the capability update information is a field shown in (d) in FIG. 4. In this case, the second network entity obtains a second bit that is in the field and whose value is the first specified value 1, and the obtained updated capability of the first network entity includes an SR-TE capability corresponding to the second bit.

After obtaining the updated capability of the first network entity, the second network entity replaces the recorded capability supported by the first network entity with the updated capability of the first network entity.

3032. The second network device determines, from the updated capability of the first network entity, a capability supported by the second network entity. The determined capability is a capability supported by both the first network entity and the second network entity.

In 3032, the second network entity obtains an intersection set between the updated capability of the first network entity and the capability supported by the second network entity, to obtain a capability supported by both the first network entity and the second network entity.

For example, in the foregoing first example, the updated capability of the first network entity includes an SRv6 capability, an SR-TE capability, and an SR policy capability. The capability supported by the second network entity includes an SRv6 capability, an SR-TE capability, and an SR policy capability. Therefore, the capability supported by both the first network entity and the second network entity includes the SRv6 capability, the SR-TE capability, and the SR policy capability.

For another example, in the foregoing second example, the updated capability of the first network entity includes an SR-TE capability. The capability supported by the second network entity includes an SRv6 capability, an SR-TE capability, and an SR policy capability. Therefore, the capability supported by both the first network entity and the second network entity includes an SR-TE capability.

3033. The capability of the capability negotiation session on the second network entity side is updated by the second network entity to the determined capability.

For example, in the foregoing first example, the capability supported by both the first network entity and the second network entity includes an SRv6 capability, an SR-TE capability, and an SR policy capability. Therefore, the capability of the capability negotiation session on the second network entity side is updated to an SRv6 capability, an SR-TE capability, and an SR policy capability.

For another example, in the foregoing second example, the capability supported by both the first network entity and the second network entity includes an SR-TE capability. Therefore, the capability of the capability negotiation session on the second network entity side is updated to an SRv6 capability, an SR-TE capability, and an SR-TE capability.

The first network entity is a PCC, and the second network entity is a PCE. For example, when the capability of the PCC is updated, the PCC renegotiates a capability with the PCE through the operations 301 to 303. Alternatively, the first network entity is a PCE, and the second network entity is a PCC. For example, when the capability of the PCE is updated, the PCE renegotiates a capability with the PCC through the operations 301 to 303.

After capability renegotiation, the PCC performs service interaction with the PCE. For example, a path service is used as an example. The PCC requests, based on the capability negotiation session, the PCE to establish a path. If a capability corresponding to the path is the capability of the capability negotiation session on the PCE side, the PCE establishes the path for the PCC: or if a capability corresponding to the path is not the capability of the capability negotiation session on the PCE side, the PCE rejects to establish the path for the PCC.

Alternatively, the PCE establishes a path for the PCC, and sends path information of the path to the PCC based on the capability negotiation session. If a capability corresponding to the path is the capability of the capability negotiation session on the PCC side, the PCC receives the path information of the path: or if a capability corresponding to the path is not the capability of the capability negotiation session on the PCC side, the PCC rejects to receive the path information of the path.

In this embodiment, when a capability of the first network entity is updated, the first network entity sends a capability update message to the second network entity based on a capability negotiation session established between the first network entity and the second network entity. The capability update message includes capability update information. The capability update information indicates at least one capability to be updated of the first network entity. In this way, the second network entity updates the capability of the capability negotiation session on the second network entity side based on the at least one capability. Because the established capability negotiation session is a session used by the first network entity and the second network entity for capability negotiation last time, and the first network entity and the second network entity maintain the capability negotiation session not to be disconnected. When a capability is renegotiated, the first network entity may directly use the established capability negotiation session to implement dynamic capability negotiation. When the capability is renegotiated, the capability negotiation session does not need to be released, and a capability negotiation session does not need to be re-established. This simplifies a process of capability re-negotiation, thereby improving efficiency of capability negotiation, and reducing load of the first network entity and the second network entity. In addition, dynamic capability negotiation is implemented between the first network entity and the second network entity, to facilitate upgrade of the network to introduce a new feature, and reduce an impact on an existing service.

Figure 7:
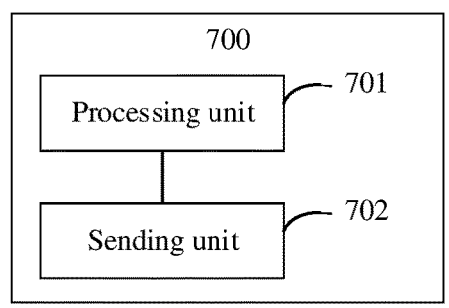
FIG. 7 is a schematic diagram of a structure of an apparatus for capability negotiation according to an embodiment.

Referring to FIG. 7, an embodiment provides an apparatus 700 for capability negotiation. The apparatus 700 may be deployed on the first network entity provided in the embodiment shown in FIG. 3. For example, the first network entity is a PCE or a PCC in the network architecture shown in FIG. 1. For example, the apparatus 700 is deployed on the PCE or the PCC. The apparatus 700 includes:

a processing unit 701 configured to obtain a capability update message, where the capability update message includes capability update information, and the capability update information indicates at least one capability to be updated of the apparatus 700; and a sending unit 702 configured to send the capability update message to the second network entity based on a capability negotiation session established between the apparatus 700 and a second network entity.

For a detailed implementation process in which the processing unit 701 obtains the capability update message, refer to related content in the operation 301 in the embodiment shown in FIG. 3. Details are not described herein again.

In some embodiments, the at least one capability may include an updated capability of the apparatus 700, and the capability update information includes capability information of the updated capability.

In some embodiments, the at least one capability may include an added capability of the apparatus 700, and the capability update information includes capability information of the added capability.

In some embodiments, the at least one capability may include a reduced capability of the apparatus 700, and the capability update information includes capability information of the reduced capability.

The processing unit 701 may be further configured to:
establish the capability negotiation session; and negotiate one or more capabilities with the second network entity based on the capability negotiation session.

For a detailed implementation process of establishing the capability negotiation session and capability negotiation by the processing unit 701, refer to related content in the embodiment shown in FIG. 1. Details are not described herein again.

The capability update message may include a path computation element communication protocol open (PCEP open) message or a path computation element communication protocol notification (PCNtf) message.

If the capability update message includes the PCEP open message, the PCEP open message may further include a dynamic capability negotiation identifier. The dynamic capability negotiation identifier indicates to renegotiate a capability required by the apparatus 700.

If the capability update message includes the PCNtf message, a payload of the PCNtf message may include the capability update information.

The capability negotiation session may be a PCEP session.

In this embodiment, the sending unit may send the capability update message to the second network entity based on the capability negotiation session established between the first network entity and the second network entity. For example, when the apparatus renegotiates a capability, the apparatus does not need to disconnect from the capability negotiation session or re-establish a capability session with the second network entity, but the capability negotiation session established between the apparatus and the second network entity is directly used to renegotiate the capability, to implement dynamic capability negotiation. In this way, a process of capability renegotiation is simplified, thereby improving efficiency of capability negotiation, and reducing load of the apparatus and the second network entity.

Figure 8:
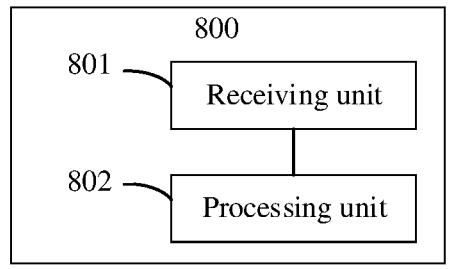
FIG. 8 is a schematic diagram of a structure of another apparatus for capability negotiation according to an embodiment.

Referring to FIG. 8, an embodiment provides an apparatus 800 for capability negotiation. The apparatus 800 may be deployed on the second network entity provided in the embodiment shown in FIG. 3. For example, the first network entity is a PCE or a PCC in the network architecture shown in FIG. 1. For example, the apparatus 800 is deployed on the PCE or the PCC. The apparatus 800 includes:
- a receiving unit 801 configured to receive, based on a capability negotiation session established between the apparatus 800 and a first network entity, a capability update message sent by the first network entity, where the capability update message includes capability update information, and the capability update information indicates at least one capability to be updated of the first network entity; and
- a processing unit 802 configured to update an effective capability of the apparatus 800 based on the at least one capability.

For a detailed implementation process in which the processing unit 802 updates the effective capability of the apparatus 800, refer to related content in the operation 302 in the embodiment shown in FIG. 3. Details are not described herein again.

In some embodiments, the at least one capability may include an updated capability of the first network entity, and the capability update information includes capability information of the updated capability.

In some embodiments, the at least one capability may include an added capability of the first network entity, and the capability update information includes capability information of the added capability.

In some embodiments, the at least one capability may include a reduced capability of the first network entity, and the capability update information includes capability information of the reduced capability.

The processing unit 802 may be further configured to:
- establish the capability negotiation session; and
- negotiate one or more capabilities with a first network entity based on the capability negotiation session, where the effective capability includes a capability that is successfully negotiated by the apparatus 800.

For a detailed implementation process of establishing the capability negotiation session and capability negotiation by the processing unit 802, refer to related content in the embodiment shown in FIG. 1. Details are not described herein again.

The capability update message may include a path computation element communication protocol open (PCEP open) message or a path computation element communication protocol notification (PCNtf) message.

If the capability update message includes the PCEP open message, the PCEP open message may further include a dynamic capability negotiation identifier. The dynamic capability negotiation identifier indicates to renegotiate a capability required by the first network entity.

The processing unit 802 may be configured to:
- when triggered by the dynamic capability negotiation identifier, update the effective capability of the apparatus 800 based on the at least one capability.

If the capability update message includes the PCNtf message, a payload of the PCNtf message may include the capability update information.

The capability negotiation session may be a PCEP session.

In this embodiment, the receiving unit receives, based on the capability negotiation session established between the second network entity and the first network entity, the capability update message sent by the first network entity. For example, when the capability is renegotiated with the first network entity, the capability negotiation session does not need to be disconnected, and the capability session with the first network entity does not need to be re-established, but the capability negotiation session established between the first network entity and the apparatus is directly used to renegotiate the capability, to implement dynamic capability negotiation. In this way, a process of capability renegotiation is simplified, thereby improving efficiency of capability negotiation, and reducing load of the first network entity and the apparatus.

Figure 9:
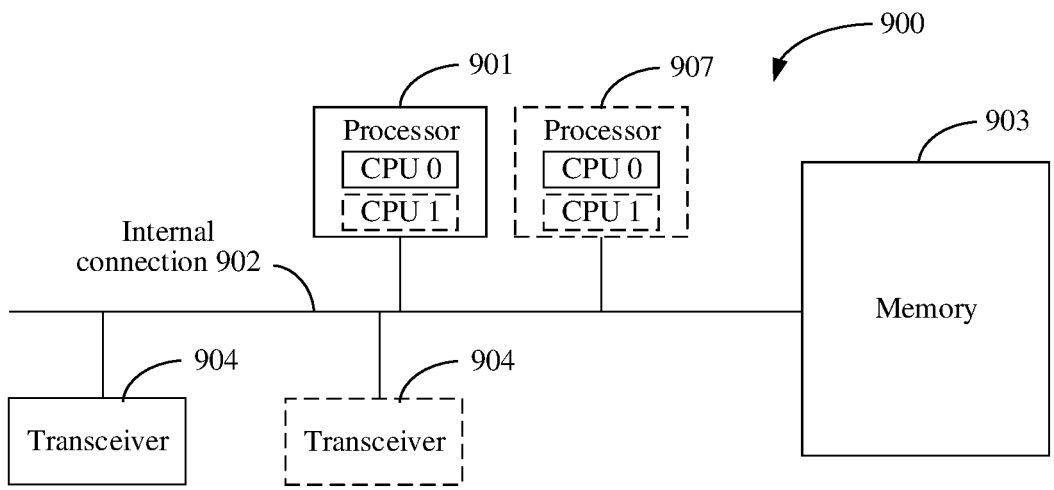
FIG. 9 is a schematic diagram of a structure of another apparatus for capability negotiation according to an embodiment.

FIG. 9 is a schematic diagram of an apparatus 900 for capability negotiation according to an embodiment. The apparatus 900 may be the first network entity in the embodiment shown in FIG. 3. For example, the first network entity is a PCE or a PCC in the network architecture shown in FIG. 1. For example, the apparatus 900 may be the PCE or the PCC. The apparatus 900 includes at least one processor 901, an internal connection 902, a memory 903, and at least one transceiver 904.

The apparatus 900 is an apparatus of a hardware structure, and may be configured to implement functional modules in the apparatus 700 shown in FIG. 7. For example, a person skilled in the art may figure out that the processing unit 701 in the apparatus 700 shown in FIG. 7 may be implemented by the at least one processor 901 by invoking code in the memory 903, and the sending unit 702 in the apparatus 700 shown in FIG. 7 may be implemented by the at least one transceiver 904.

The apparatus 900 may be further configured to implement a function of the first network entity in any one of the foregoing embodiments.

The processor 901 may be a general-purpose central processing unit (CPU), a network processor (NP), a microprocessor, an application-specific integrated circuit (ASIC), or one or more integrated circuits configured to control program execution of the solutions of the embodiments.

The internal connection 902 may include a channel in which information is transmitted between the foregoing components. The internal connection 902 may be a board, a bus, or the like.

The at least one transceiver 904 is configured to communicate with another device or a communication network.

The memory 903 may be a read-only memory (ROM) or another type of static storage device that can store static information and instructions, a random access memory (RAM) or another type of dynamic storage device that can store information and instructions: or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), and a disk storage medium or another disk storage device, or any other medium that can be used to carry or store expected program code in a form of instructions or a data structure and that can be accessed by a computer. However, the memory 903 is not limited herein. The memory may exist independently, and is connected to the processor through the bus. The memory may alternatively be integrated with the processor.

The memory 903 is configured to store application code for performing the solutions in this application, and the application code is executed under control of the processor 901. The processor 901 is configured to execute the application code stored in the memory 903, and match the at least one transceiver 904, to enable the apparatus 900 to implement a function in the method in the embodiments.

During implementation, in an embodiment, the processor 901 may include one or more CPUs such as a CPU 0 and a CPU 1 in FIG. 9.

In an embodiment, the apparatus 900 may include a plurality of processors such as the processor 901 and a processor 907 in FIG. 9. Each of the processors may be a single-core (single-CPU) processor, or may be a multi-core (multi-CPU) processor. The processor herein may be one or more devices, circuits, and/or processing cores configured to process data (for example, computer program instructions).

Figure 10:
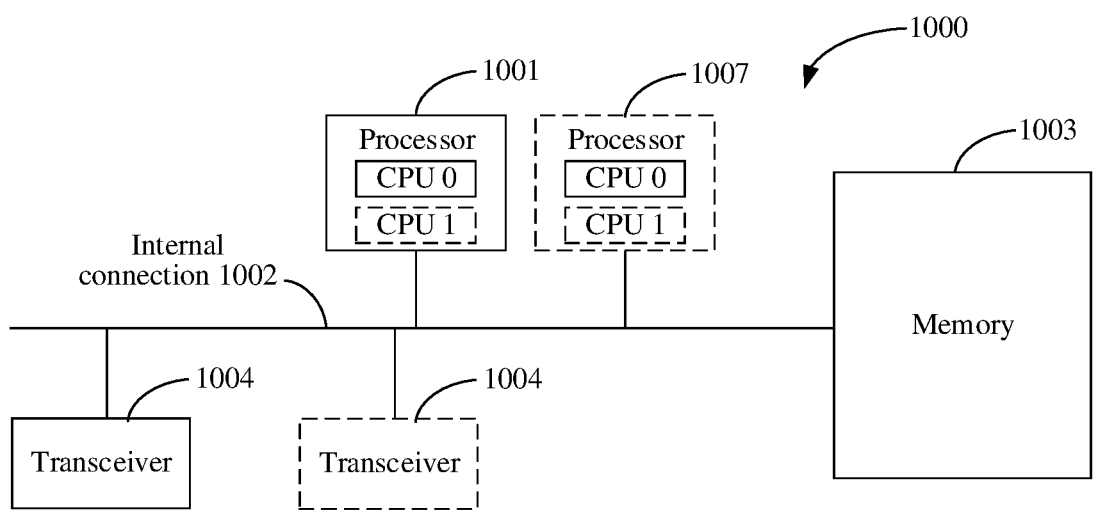
FIG. 10 is a schematic diagram of a structure of another apparatus for capability negotiation according to an embodiment.

FIG. 10 is a schematic diagram of an apparatus 1000 for capability negotiation according to an embodiment. The apparatus 1000 may be the second network entity in the embodiment shown in FIG. 3. For example, the second network entity is a PCE or a PCC in the network architecture shown in FIG. 1. For example, the apparatus 1000 may be the PCE or the PCC. The apparatus 1000 includes at least one processor 1001, an internal connection 1002, a memory 1003, and at least one transceiver 1004.

The apparatus 1000 is an apparatus of a hardware structure, and may be configured to implement functional modules in the apparatus 800 shown in FIG. 8. For example, a person skilled in the art may understand that the processing unit 802 in the apparatus 800 shown in FIG. 8 may be implemented by the at least one processor 1001 by invoking code in the memory 1003, and the receiving unit 801 in the apparatus 800 shown in FIG. 8 may be implemented by the at least one transceiver 1004.

The apparatus 1000 may be further configured to implement a function of the second network entity in any one of the foregoing embodiments.

The processor 1001 may be a general-purpose central processing unit (CPU), a network processor (NP), a microprocessor, an application-specific integrated circuit (ASIC), or one or more integrated circuits configured to control program execution of the solutions of the embodiments.

The internal connection 1002 may include a channel in which information is transmitted between the foregoing components. The internal connection 1002 may be a board, a bus, or the like.

The at least one transceiver 1004 is configured to communicate with another device or a communication network.

The memory 1003 may be a read-only memory (ROM) or another type of static storage device that can store static information and instructions, a random access memory (RAM) or another type of dynamic storage device that can store information and instructions: or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), and a disk storage medium or another disk storage device, or any other medium that can be used to carry or store expected program code in a form of instructions or a data structure and that can be accessed by a computer. However, the memory 1003 is not limited herein. The memory may exist independently, and is connected to the processor through the bus. The memory may alternatively be integrated with the processor.

The memory 1003 is configured to store application code for performing the solutions in the embodiments, and the application code is executed under control of the processor 1001. The processor 1001 is configured to execute the application code stored in the memory 1003, and cooperate with the at least one transceiver 1004, to enable the apparatus 1000 to implement a function in the method in the embodiments.

In an embodiment, the processor 1001 may include one or more CPUs such as a CPU 0 and a CPU 1 in FIG. 10.

In an embodiment, the apparatus 1000 may include a plurality of processors such as the processor 1001 and a processor 1007 in FIG. 10. Each of the processors may be a single-core (single-CPU) processor, or may be a multi-core (multi-CPU) processor. The processor herein may be one or more devices, circuits, and/or processing cores configured to process data (for example, computer program instructions).

Figure 11:
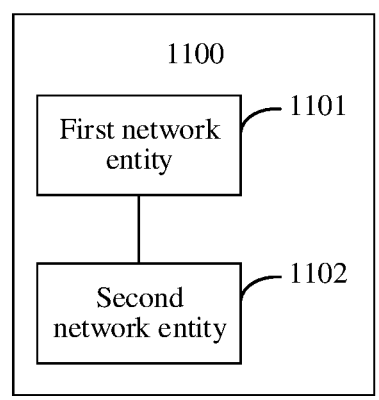
FIG. 11 is a schematic diagram of a structure of a system for capability negotiation according to an embodiment

FIG. 11 is a schematic diagram of a system 1100 for capability negotiation according to an embodiment. The system 1100 includes the apparatus 700 shown in FIG. 7 and the apparatus 800 shown in FIG. 8, or includes the apparatus 900 shown in FIG. 9 and the apparatus 1000 shown in FIG. 10.

The apparatus 700 shown in FIG. 7 and the apparatus 900 shown in FIG. 9 may be a first network entity 1101. The apparatus 800 shown in FIG. 8 and the apparatus 1000 shown in FIG. 10 may be a second network entity 1102.

A person of ordinary skill in the art may understand that all or a part of the operations of embodiments may be implemented by hardware or a program instructing related hardware. The program may be stored in a computer-readable storage medium. The storage medium may include a read-only memory, a magnetic disk, an optical disc, or the like.

The foregoing descriptions are only optional embodiments, and are not intended as limiting. Any modification, equivalent replacement, or improvement should fall within the scope of the embodiments.

What is claimed is:

1. A method for capability negotiation, comprising:
obtaining, by a first network entity, a capability update message, wherein the capability update message comprises capability update information, and the capability update information indicates at least one capability to be updated of the first network entity;
sending, by the first network entity, the capability update message to the second network entity based on a capability negotiation session established between the first network entity and a second network entity;
wherein the capability negotiation session does not require a reconnection between the first network entity and the second network entity;
wherein the capability update message comprises a path computation element communication protocol open (PCEP open) message or a path computation element communication protocol notification (PCNtf) message; and
when the capability update message comprises the PCEP open message, the PCEP open message further comprises a dynamic capability negotiation identifier, and the dynamic capability negotiation identifier indicates to renegotiate a capability required by the first network entity.

2. The method for capability negotiation according to claim 1, wherein the at least one capability comprises an updated capability of the first network entity, and the capability update information comprises capability information of the updated capability;
the at least one capability comprises an added capability and/or a reduced capability of the first network entity, and the capability update information comprises capability information of the added capability and/or the reduced capability.

3. The method for capability negotiation according to claim 1, wherein before obtaining, by the first network entity, a capability update message, the method further comprises:
establishing, by the first network entity, the capability negotiation session; and
negotiating, by the first network entity, one or more capabilities with the second network entity based on the capability negotiation session.

4. The method for capability negotiation according to claim 1, wherein when the capability update message comprises the PCNtf message, a payload of the PCNtf message comprises the capability update information.

5. The method for capability negotiation according to claim 1, wherein the capability negotiation session is a PCEP session.

6. The method for capability negotiation according to claim 1, wherein the first network entity does not disconnect from the second network entity.

7. An apparatus for capability negotiation, comprising:
a non-transitory memory storing instructions; and
a processor coupled to the non-transitory memory;
wherein the instructions, when executed by the processor, cause the apparatus to be configured to:
obtain a capability update message, wherein the capability update message comprises capability update information, and the capability update information indicates at least one capability to be updated of the apparatus;
send the capability update message to the second network entity based on a capability negotiation session established between the apparatus and a second network entity;
wherein the capability negotiation session does not require a reconnection between the first network entity and the second network entity;
wherein the capability update message comprises a path computation element communication protocol open (PCEP open) message or a path computation element communication protocol notification (PCNtf) message; and
when the capability update message comprises the PCEP open message, the PCEP open message further comprises a dynamic capability negotiation identifier, and the dynamic capability negotiation identifier indicates to renegotiate a capability required by the apparatus.

8. The apparatus for capability negotiation according to claim 7, wherein the at least one capability comprises an updated capability of the apparatus, and the capability update information comprises capability information of the updated capability;
the at least one capability comprises an added capability and/or a reduce capability of the apparatus, and the capability update information comprises capability information of the added capability and/or the reduced capability.

9. The apparatus for capability negotiation according to claim 7, wherein the instructions, when executed by the processor, further cause the apparatus to be configured to:
establish the capability negotiation session; and
negotiate one or more capabilities with the second network entity based on the capability negotiation session.

10. The apparatus for capability negotiation according to claim 7, wherein when the capability update message comprises the PCNtf message, a payload of the PCNtf message comprises the capability update information.

11. The apparatus for capability negotiation according to claim 7, wherein the first network entity does not disconnect from the second network entity.

12. An apparatus for capability negotiation, comprising:
a non-transitory memory storing instructions; and
a processor coupled to the non-transitory memory;
wherein the instructions, when executed by the processor, cause the apparatus to be configured to:
receive, based on a capability negotiation session established between the apparatus and a first network entity, a capability update message sent by the first network entity, wherein the capability update message comprises capability update information, and the capability update information indicates at least one capability to be updated of the first network entity;
update an effective capability of the apparatus based on the at least one capability; wherein the capability negotiation session does not require a reconnection between the first network entity and the second network entity;
wherein the capability update message comprises a path computation element communication protocol open (PCEP open) message or a path computation element communication protocol notification (PCNtf) message; and
when the capability update message comprises the PCEP open message, the PCEP open message further comprises a dynamic capability negotiation identifier, and the dynamic capability negotiation identifier indicates to renegotiate a capability required by the first network entity.

13. The apparatus for capability negotiation according to claim 12, wherein the at least one capability comprises an updated capability of the first network entity, and the capability update information comprises capability information of the updated capability;

the at least one capability comprises an added capability and/or reduced capability of the first network entity, and the capability update information comprises capability information of the added capability and/or reduced capability.

14. The apparatus for capability negotiation according to claim 12, wherein the instructions, when executed by the processor, further cause the apparatus to be configured to:

establish the capability negotiation session; and negotiate one or more capabilities with the first network entity based on the capability negotiation session, wherein the effective capability comprises a capability that is successfully negotiated by the apparatus.

15. The apparatus for capability negotiation according to claim 12, wherein the instructions, when executed by the processor, further cause the apparatus to be configured to:

when triggered by the dynamic capability negotiation identifier, update the effective capability of the apparatus based on the at least one capability.

16. The apparatus for capability negotiation according to claim 12, wherein when the capability update message comprises the PCNtf message, a payload of the PCNtf message comprises the capability update information.

17. The apparatus for capability negotiation according to claim 12, wherein the first network entity does not disconnect from the second network entity.

* * * * *